United States Patent [19]
Wolters et al.

[11] Patent Number: 5,657,732
[45] Date of Patent: Aug. 19, 1997

[54] METHOD AND DEVICE FOR REGULATING THE $NO_x$ EMISSION OF AN INTERNAL COMBUSTION ENGINE

[75] Inventors: Leendert Wolters, Rhoon; Johan Lugtenburg, Oostvoorne, both of Netherlands

[73] Assignee: Deltec Fuel Systems B.V., Rotterdam, Netherlands

[21] Appl. No.: 587,979

[22] Filed: Jan. 17, 1996

[30] Foreign Application Priority Data

Jan. 27, 1995 [NL] Netherlands ............................ 9500154

[51] Int. Cl.⁶ ............................................. F02D 41/04
[52] U.S. Cl. .......................... 123/436; 123/486; 123/527
[58] Field of Search ..................................... 123/435, 436, 123/478, 480, 486, 527

[56] References Cited

U.S. PATENT DOCUMENTS

| | | | |
|---|---|---|---|
| 4,513,721 | 4/1985 | Ina et al. | 123/478 |
| 4,867,127 | 9/1989 | Quirchmayr et al. | 123/527 |
| 5,027,773 | 7/1991 | Shimomura et al. | 123/425 |
| 5,067,460 | 11/1991 | Van Duyne | 123/337 |
| 5,107,815 | 4/1992 | Van Duyne | 123/435 |
| 5,156,126 | 10/1992 | Ohkubo et al. | 123/435 X |
| 5,413,075 | 5/1995 | Mamiya et al. | 123/435 X |

*Primary Examiner*—Tony M. Argenbright
*Attorney, Agent, or Firm*—Young & Thompson

[57] ABSTRACT

Method and device for regulating the $NO_x$ emission of an internal combustion engine. It has been found that the $NO_x$ emission is dependent on the efficiency of the engine. That is to say the $NO_x$ emission can be optimized by determining and controlling the efficiency. This can be performed by making the measured and determined efficiencies equal to one another by altering the air/fuel ratio.

14 Claims, 2 Drawing Sheets

METHOD AND DEVICE FOR REGULATING THE $NO_x$ EMISSION OF AN INTERNAL COMBUSTION ENGINE

The present invention relates to a method for regulating an internal combustion engine, comprising the adjusting of the air/fuel ratio as a function of the operating conditions of said engine, the output of said engine being measured.

Two systems are known in the prior art for controlling the emission of nitrogen oxides.

In the first system, direct measurements are performed in the cylinder or cylinder head. Said measurements relate to temperature measurements. It is, after all, known that bonding of oxygen to nitrogen is dependent to an appreciable extent on the combustion temperature of the mixture in the cylinder.

This method has the advantage that it functions particularly well, but it has the disadvantage that the devices for determining the temperature are particularly sensitive and have a limited service life.

In addition, such devices require appreciable interventions in the combustion engine, which means that subsequent incorporation is impossible or is possible only by applying special effort.

In the case of fairly small cylinders and cylinder heads, it is not possible to measure sufficiently accurately.

The other group of methods for reducing the nitrogen oxide component is based on the so-called indirect measurement. That is to say derivatives of the combustion temperature are used to control the engine.

Thus, it is known that a leaner mixture, that is to say a mixture containing a greater excess of air, gives a lower combustion temperature. In addition, a hotter mixture gives a higher combustion temperature. It has also been found that there is a relationship between, on the one hand, the engine output and, on the other hand, the pressure and temperature in the inlet duct (see, for example, European Patent 0 259 382).

In some of the methods described above, $\lambda$-sensors, which are susceptible to ageing, are used. If the quality of the gas, that is to say the calorific value, varies, it has been found that, for equal $\lambda$ (air/fuel ratio) a varying $NO_x$ emission occurs. In addition, for an unduly lean mixture, it is known that output instability occurs, that is to say the engine no longer runs evenly.

As a result of internal alterations in the engine which alter the cylinder charge, such as, for example, a change in the valve clearance or in the outlet back pressure, the determination of the pressure in the inlet manifold becomes an unreliable method. It has also been found that the determination of the mixture temperature correction is difficult in practice because the temperature of the mixture drawn in is difficult to control.

The object of the present invention is to provide a method and a device which does not have said disadvantages and in which the $NO_x$ emission can be limited according to requirement with the aid of the indirect method using means which are known in the prior art and which can be controlled well.

This object is achieved in the case of a method described above, which method comprises the determination of the desired efficiency of said engine under said operating conditions, the measurement of the efficiency under said operating conditions and the alteration of the air/fuel ratio of the mixture in such a way that the determined and measured efficiencies are equal, the air/fuel ratio being reduced if the measured efficiency is higher than the determined efficiency.

Surprisingly, it has been found that there is a relationship between the mechanical efficiency of a combustion engine and the combustion temperature and, as stated above, the combustion temperature is of importance for the $NO_x$ emission. That is to say, if the efficiency is kept constant at a certain output, the $NO_x$ emission will also be constant. In this connection, it is unimportant whether parameters, such as the inlet temperature, inlet pressure, gas composition, vary. As long as the efficiency remains constant, the $NO_x$ emission will not change.

Even if the mixture strength changes, it has been found that, at constant efficiency, the $NO_x$ emission remains unchanged. This means that, for varying composition of the gas and/or other parameters, such as delivery pressure and delivery temperature, a constant emission can be achieved with the regulation according to the invention.

If the engine is a stationary engine which continuously rotates at the same speed, the efficiency varies as a function of the loading. If, however, the engine is operated at varying speed and varying loading, the efficiency can be read, according to the invention, from a table which is determined on the basis of the characteristic diagram of said engine.

It is possible to combine the method described above with regulating systems for keeping the speed and/or the output of the engine constant. Because changes in air/fuel composition, to which the invention relates, will generally proceed less quickly than changes in speed and/or output, preference is given to performing responses to such changes relatively quickly to regulate the engine speed or output and relatively slowly to vary the air/fuel ratio. The efficiency of the engine can be measured in all the ways known in the prior art.

One method comprises the arithmetical determination of the desired gas flow from measurements on the engine. Such measurements may comprise, for example, the measurement of the air flow. A so-called 'hot wire flow meter' can be used for this purpose. In this case, air flows over a heated wire and the change in resistance due to cooling of the wire by the air moving over the wire is recorded and converted into an air flow. It is also possible to determine these quantities from the mixture flow.

In this connection, the desired gas flow is determined by measuring various parameters of the combustion engine, also known under the name 'speed/density method'.

In the speed/density method, the temperature and pressure of the mixture are determined in the inlet duct of the combustion engine, as well as the volumetric efficiency and the stroke volume of the latter.

Assuming that the desired air/fuel ratio is known, the gas flow can be calculated either from the air flow determined or from the mixture flow.

Proceeding from the insight that the mechanical efficiency is critical for the $NO_x$ emission, this means that, according to the invention, it is no longer important to know the air/fuel ratio or the mixture temperature and gas quality.

The mechanical efficiency can be reproduced in the form of a formula as follows.

$$\eta \text{ mech} = \frac{P}{Q_{gn} \times H_u} \quad (I)$$

where

P=output in kW $Q_{gn}$=normalized gas flow in $nm^3/sec$ $H_u$=net calorific value of the gas in $kJ/nm^3$.

If the engine is operated at constant output and speed, this means that both the mechanical efficiency and P are constant. It then follows from formula (I) that $Q_{gn} \times H_u$ is constant.

If, for example, the gas quality becomes higher, the gas flow should, according to the above formula, be reduced accordingly to keep the output and the mechanical efficiency constant with the same quantity of air delivered.

In order to verify the theory on which the present invention is based, some measurements have been performed and a test arrangement has been made.

Figure 1:
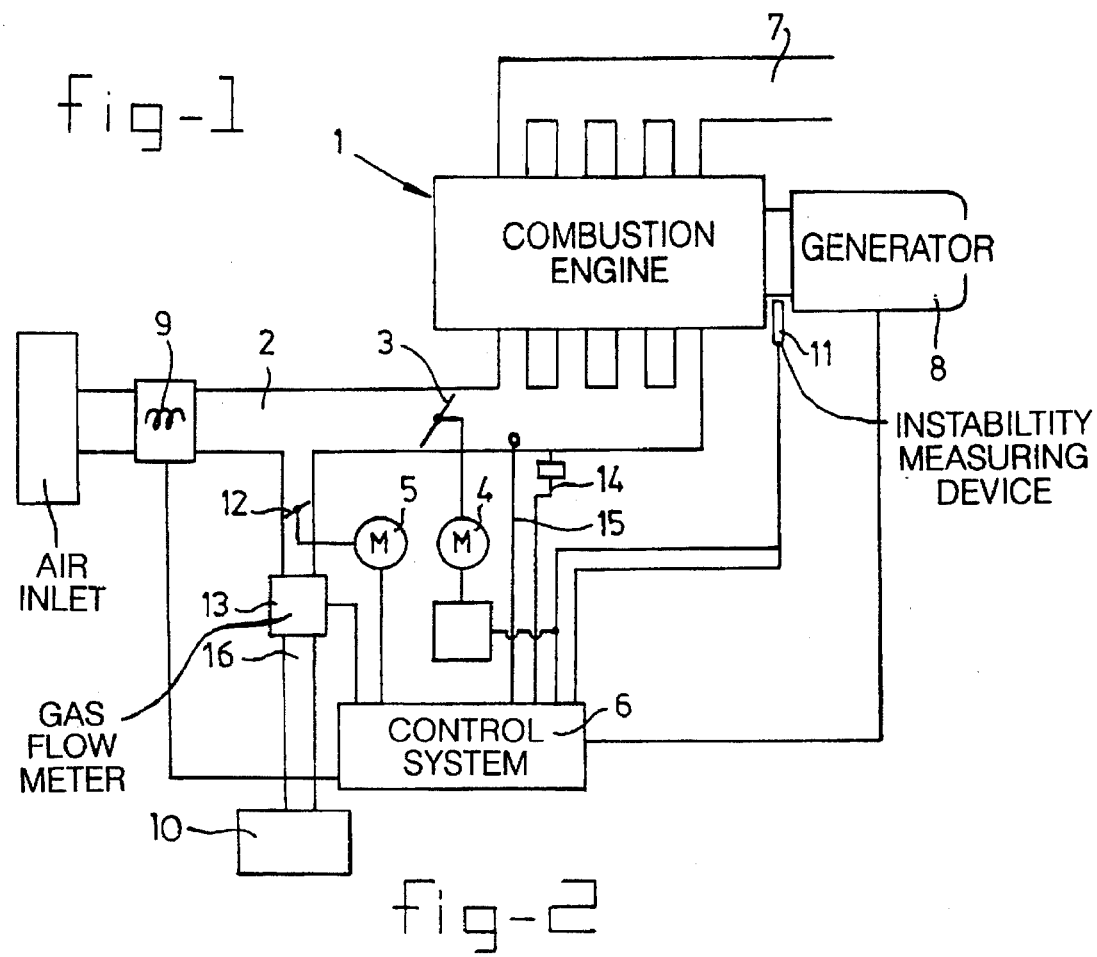
FIG. 1 shows an example of the regulating system according to the present invention.

In FIG. 1, 1 shows a combustion engine provided with an inlet duct 2 having a throttle valve 3 for the mixture flow which is installed therein and which is regulated by a regulating member 4. Indicated by 9 is a 'hot wire flow' meter for the air flow, which is connected to the control system 6. Gas is delivered via a line in which there is a metering valve 12 which is controlled by a motor 5 which receives its signals from control system 6. A gas flow meter is indicated by 13. Combustion engine 1 is provided with an outlet 7 and with a device with which, inter alia, the output of the engine can be determined, such as a generator 8. The output power—measuring output of the generator 8 is also connected to control system 6. The gas line 16 is connected to a gas reservoir 10. Present in the inlet duct 2 downstream of the throttle valve 3 are a temperature sensor and a pressure gauge which are connected to control system 6 via line 15 and 14, respectively.

A device for measuring the instability of the engine is shown by 11. If, for any reason, the combustion cannot be optimized within certain limits as a result, for example, of the complete or partial failure of a cylinder, this instability meter 11 will emit a signal and disable the regulating system and continue to run at the basic setting.

If the abovementioned regulating system is used to drive generator 8 at constant speed and output, the following will occur if the gas quality changes:

If, for example, gas having a higher calorific value is supplied, throttle valve 3 will be closed slightly by a quick regulation to control both the output and the speed as a first response aimed at keeping the engine speed and the output delivered constant.

In the position before the delivery of the slightly enriched gas, the mechanical efficiency is determined in control system 6 on the basis of the table stored therein. $Q_{gn}$ is determined on the basis of either the quantity of air delivered as determined by flow meter 9 or by the 'speed/density method' dependent from the signals from the temperature sensor and pressure gauges in the inlet channel. In this connection, use is made of the stoichiometric λ of the outlet gas.

After the closing of the gas valve, the output will be recalculated assuming the same stoichiometric λ (which is now incorrect). Because the $Q_{gn}$ has now decreased, a difference will arise between the calculated output and the measured output, that is to say, for unchanged efficiency, the calculated output is lower than the measured output in the case of enrichment.

As a result of subsequently changing the air/fuel ratio, that is to say of limiting the quantity of gas in this case, the output of the engine will tend to fall, as a result of which the throttle valve 3 is opened.

Figure 2:
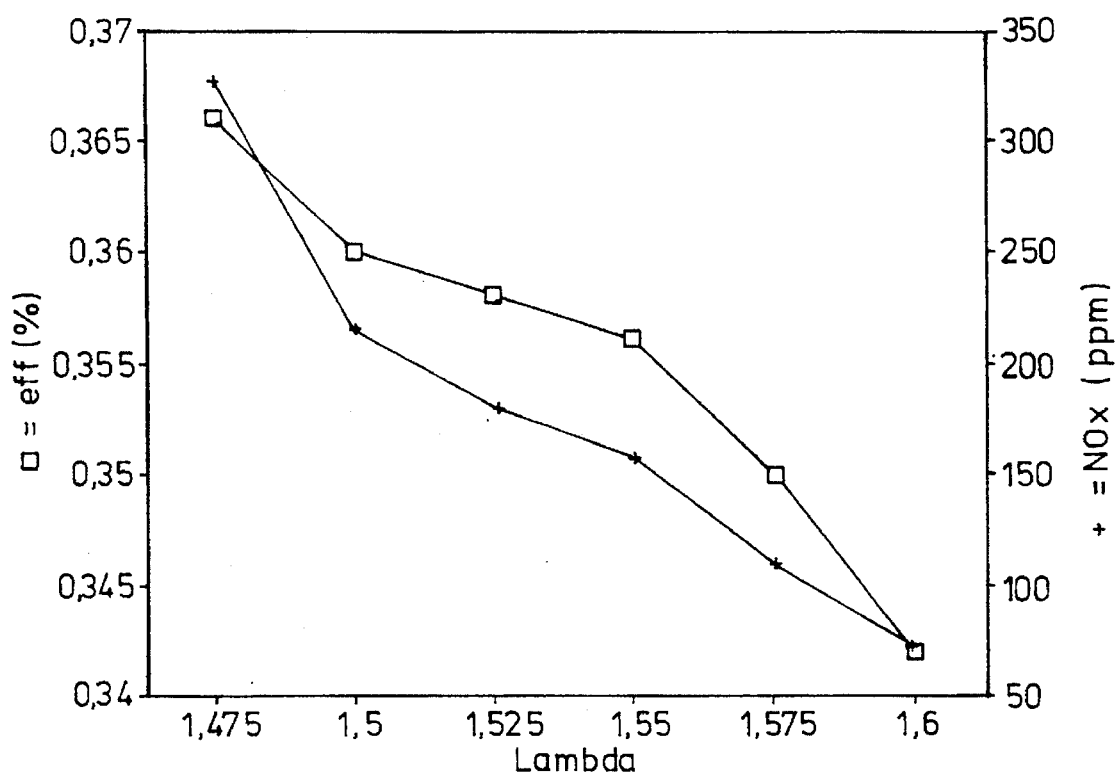
FIG. 2 shows efficiency and $NO_x$ emissions for various air-fuel ratios.

The result of this measure is that $Q_{gn}$ returns to the old value and the λ-value is changed. That is to say the same efficiency is maintained with a changed air/fuel ratio. As indicated above, it has been found, surprisingly, that a change in the efficiency amounts, in fact, to a change in the $NO_x$ emission. This is illustrated by reference to FIG. 2 for various air/fuel ratios. The measurements shown therein have been performed on a 'lean burn engine' having an output of 210 kW.

It will be understood that the regulation according to the present invention occurs not only on changing the composition of the fuel delivered, but also if the temperature of the inlet air or the temperature of the gas is altered.

Figure 3:
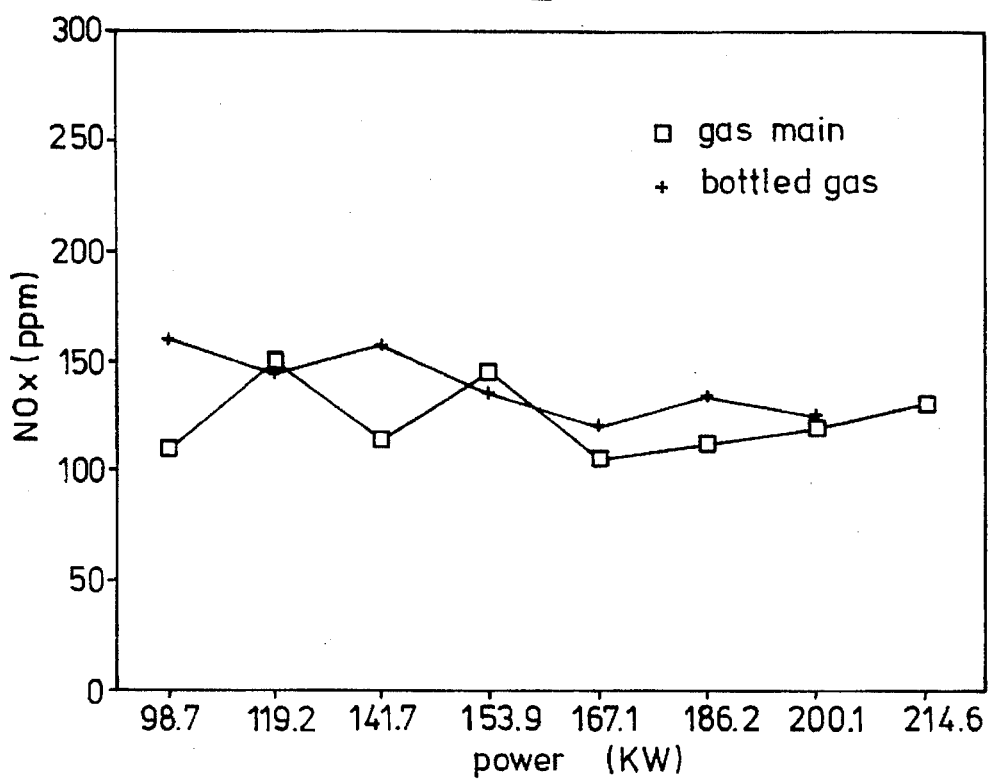
FIG. 3 shows $NO_x$ emissions versus power for different fuels.

FIG. 3 shows how approximately the same $NO_x$ emission can always be obtained by adjusting the quantity of gas delivered with the aid of the regulating system according to the present invention within a wide output range for the same engine if different fuels are supplied. The gas originating from the gas main had an $H_u$ of 31.6 MJ/M$^3$ while the bottled gas had an $H_u$ of 38.4 MJ/M$^3$. It is clear from this graph that the regulating system according to the present application gives optimum $NO_x$ values regardless of the type of gas.

Figure 4:
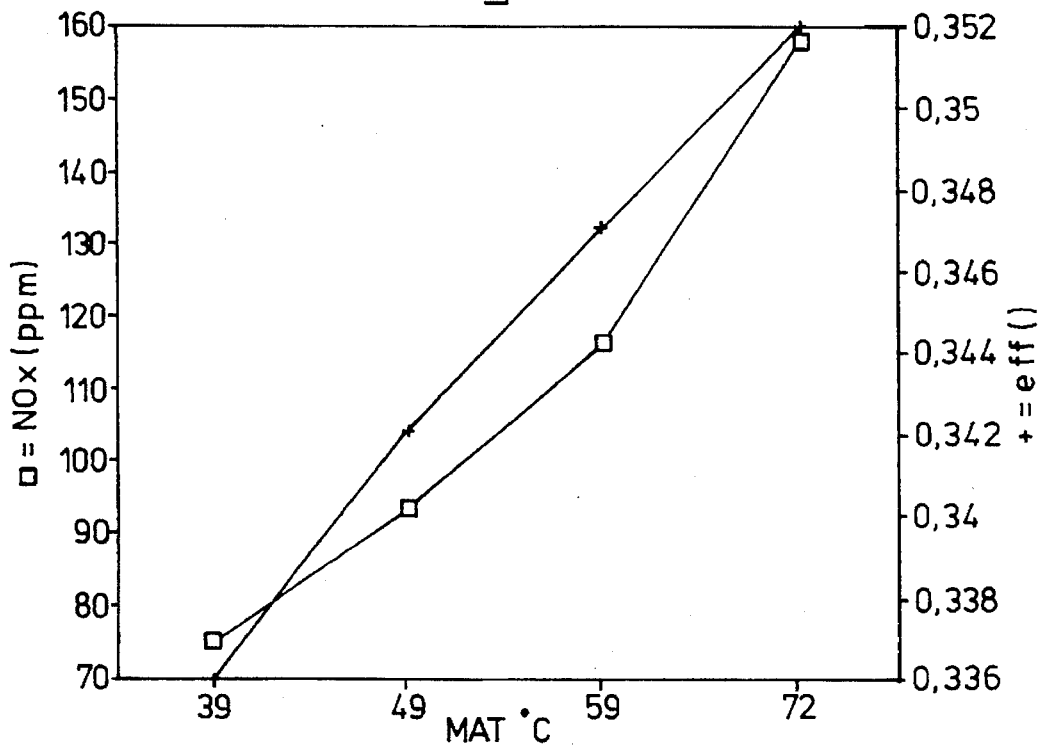
FIG. 4 shows $NO_x$ emissions and efficiency for different air temperatures.

Finally, FIG. 4 comprises in turn a comparison of the $NO_x$ emission and the efficiency. If the temperature is increased, the $NO_x$ emission appears to increase, which also applies to the efficiency.

Although the invention has been described above in combination with a quick-acting regulating system for keeping the output and speed constant, it will be understood that it can be coupled to any other regulating system and can also be obtained with various speeds and outputs. These and other changes which are obvious to the person skilled in the art are deemed to be within the scope of the appended claims.

We claim:

1. Method for regulating an internal combustion engine by adjusting of an air/fuel ratio as a function of operating conditions of said engine, the output of said engine being measured, said method comprising:

determining a desired efficiency of said engine under said operating conditions;

measuring an efficiency under said operating conditions, and altering the air/fuel ratio of an air/fuel mixture in such a way that the desired and measured efficiencies are equal, the air/fuel ratio being reduced if the measured efficiency is higher than the desired efficiency.

2. Method according to claim 1, wherein said determining step further includes providing a table in which the desired efficiency is stored as a function of output, and also determining the output.

3. Method according to claim 1, wherein said altering step keeps the output of said engine constant.

4. Method according to claim 1, wherein said altering step keeps the measured efficiency of said engine essentially constant.

5. Method according to claim 3, further comprising the consecutive steps of, under varying operating conditions, a) changing the mixture flow to keep the output constant, b) measuring the efficiency and comparing the measured efficiency with the desired efficiency and c) adapting the air/fuel ratio accordingly, optionally followed by repetition of steps a–c.

6. Method according to claim 5, wherein a rate of alteration in step a) is at least ten times as great as a rate of alteration in step c).

7. Method according to claim 1, wherein said air/fuel ratio altering step comprises a step of changing of a quantity of gas introduced.

8. Method according to claim 1, wherein said measuring step comprises a step of calculating the gas flow.

9. Method according to claim 8, wherein said calculating step comprises a step of measuring the air flow.

10. Method according to claim 8, wherein said calculating step comprises a step of measuring or determining at least one of the following parameters: manifold pressure, manifold temperature, the speed of the engine, the volumetric efficiency and the stroke volume.

11. Device for regulating a combustion engine comprising means for measuring the engine output, memory storage means, comparison means, computing means and also means for changing an air/fuel ratio controlled by the comparison means, wherein the memory storage means stores a desired efficiency of said engine, the computing means determine a measured efficiency as a function of a quantity of air/fuel mixture introduced and the comparison means become operative in the event of a difference between said measured and said desired efficiencies.

12. Device according to claim 11, wherein the memory storage means store a table in which the desired efficiency is stored as a function of an output.

13. Device according to claim 11, further comprising means for maintaining an engine output constant.

14. Device according to claim 11, further comprising means for determining an instability of the engine.

\* \* \* \* \*